April 22, 1952
P. CUTLER ET AL
2,593,992
ELECTRONIC OSCILLATOR
Filed April 11, 1950
*Fig. 1*
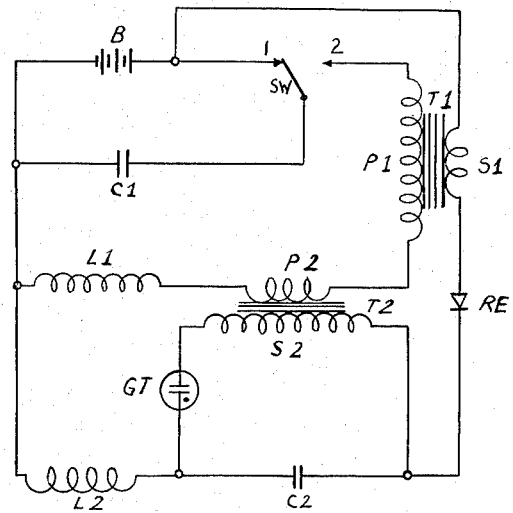
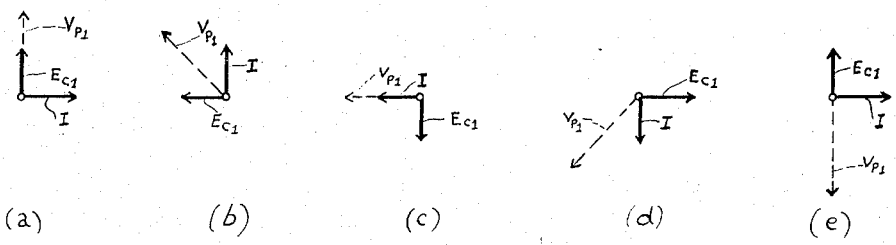
(a) (b) (c) (d) (e)
*Fig. 2*
INVENTORS
PHIL CUTLER and KARL F. ROSS
BY
*Karl F. Ross*
AGENT Patented Apr. 22, 1952

2,593,992

UNITED STATES PATENT OFFICE 2,593,992

ELECTRONIC OSCILLATOR

Phil Cutler, Brooklyn, and Karl F. Ross, Bronx, N. Y.

Application April 11, 1950, Serial No. 155,206

12 Claims. (Cl. 250—36)

This invention relates to low voltage oscillators and, in particular, to oscillators in which no mechanical interrupting device is employed.

It has heretofore been possible to obtain oscillations in circuits using only electronic expedients with the use of comparatively high voltage sources or at the cost of heavy heater current drain. Oscillators of the cold cathode type do not require a heater current but do require the aforementioned high voltages for tube discharge. Where practical considerations dictate the use of low-voltage D.-C. sources, thereby preventing the use of step-up transformers, no purely electronic circuits of which we are aware have been devised wherein the low-voltage D.-C. power is converted into oscillating power except at the expense of heater current. The problem has generally been resolved by using a mechanical interrupting device to change the low-voltage D.-C. source to alternating current and then stepping up the voltage; this involves the use of moving mechanical parts, an undesirable feature.

It is a principal object of this invention to provide a purely electronic circuit in which oscillations may be obtained with the use of low voltage, direct-current source.

Another object of the invention is to provide a circuit in which a low-voltage D.-C. source is adapted to trigger a discharge tube having a relatively high ignition voltage.

A further object of the invention is to provide an oscillatory circuit consuming a minimum of power.

Yet another object of the invention is to provide a circuit wherein a single transient is used to set off a train of oscillations.

These and other objects and advantages will become apparent after references to the accompanying drawing in which:

Fig. 1 is a schematic representation of a circuit according to the invention; and Fig. 2 comprises a series of vector diagrams, (a) through (e), indicating voltage and current relations of the circuit shown in Fig. 1.

Referring now to the drawing in detail:

Fig. 1 shows a low-voltage battery B shunted by a series arm consisting of an inductor L2, a condenser C2, a rectifier RE and the secondary S1 of a step-down transformer T1. The rectifier is polarized to pass current flowing from the positive terminal of the battery B to its negative terminal.

Also connected to the battery B is a single pole, double throw switch SW which is adapted alternatively to shunt the battery with a condenser C1 or to connect this condenser in a series arm consisting of an inductor L1, the primary P2 of a step-up transformer T2 and the primary P1 of the aforementioned transformer T1. The secondary S2 of transformer T2 is connected in series with a cold-cathode glow tube GT, the condenser C2 being bridged by this combination. The transformers T1 and T2 are so poled that the voltages induced in their secondaries S1 and S2, respectively, oppose each other.

In operation, the switch SW is initially in the position indicated at 1, thereby allowing condensers C1 and C2 to charge to the battery voltage. The switch is then thrown to position 2, causing condenser C1 to discharge through inductances P1, P2 and L1, the rate of discharge depending on the natural frequency of oscillation of the circuit thus formed. The change of current through the primary P2 of the second transformer induces instantaneously a voltage in the secondary S2 which is of the same polarity as the potential of the condenser C2 and is sufficiently great to cause ionization of the tube GT when added to the condenser voltage. Ionization of the tube causes the voltage across it to drop suddenly to a comparatively small value, permitting charge from condenser C2 to leak off rapidly through secondary coil S2. Indeed, since the reduced voltage drop across the tube will now be opposed not only by the induced voltage in secondary S2 but also by the E. M. F. due to the self-inductance of this winding, opposing a drop in the ionization current through tube GT, the condenser will discharge and may even attain a charge of opposite polarity. As a result, the battery B will start recharging the condenser C2 through the inductors L2 and S1 over the rectifier RE, and current from the battery will also flow through the glow tube until, an instant after the firing of this tube, the drop and eventual disappearance of the voltage induced in secondary S2 de-ionizes the tube. The current drawn from the battery will cause the secondary coil S1 to act as the primary of the transformer T1, inducing a voltage in the coil P1.

The subsequent action of the circuit is best explained with reference to Fig. 2. The vectors shown in this figure are positioned with reference to a fixed time axis and consequently the instantaneous values represented by these vectors are determined by their projections on the vertical (time) axis. The voltages indicated are those existing in a circuit such as shown in Fig. 1 wherein the circuit comprising condenser C1, primaries P1 and P2, and inductance L1 has a natural frequency of oscillation twice that of the circuit comprising secondary $S_1$, rectifier RE, condenser C2, inductance L2 and battery B. This frequency relation is shown in Fig. 2 by the relative angular speeds of rotation of the vectors $E_{c1}$ and $V_{P1}$, corresponding to the E. M. F. across the terminals of the condenser C1 (considered as a voltage source) and the induced voltage drop across the primary P1, respectively. Parts (a), (b) etc. of Fig. 2 represent conditions obtaining after equal increments of time, and it will be noted that the vector $E_{c1}$ rotates through a complete cycle exactly twice as fast as vector $V_{P1}$, a consequence of the 2:1 frequency ratio existing therebetween as a result of the fact that the voltage $V_{P1}$ is induced by current changes in the secondary $S_1$ which lies in the circuit of lower frequency.

Fig. 2(a) shows the voltage and current relations of the higher-frequency circuit an instant after the switch SW is thrown to position 2 and the tube GT has been momentarily unblocked. The charged condenser C1 represents a source of E. M. F. in phase with the induced voltage across the primary P1 produced by the change of current through the secondary $S_1$ as explained above. The current I through the condenser C1 and primary P1 at this instant is in quadrature with both voltages, corresponding to an instantaneous current value of zero, the normal initial condition for a resonant circuit with condenser charged.

Fig. 2(b) shows the conditions obtaining a quarter of a cycle later, referring to the oscillation period of the higher-frequency circuit. Since the current I is being driven through an inductive circuit by the E. M. F. $E_{c1}$, the former lags the latter by 90°; the voltage $V_{P1}$, however, being of a lower frequency, constantly loses ground to both and at the instant shown in Fig. 2(b) is separated from both by 45°. A component of $V_{P1}$ is now, therefore, in phase with the current I and the circuit is thus receiving power. This power, of course, is derived from the battery B, the direct-current power thereof being converted into alternating-current power as originally intended.

Fig. 2(c) shows the conditions obtaining at the half-cycle point, referring again to the higher oscillating frequency. This corresponds to the quarter-cycle point of the lower-frequency oscillating circuit. The current I and the voltage $V_{P1}$ are now in phase.

At a later interval, as shown in Fig. 2(d), the voltage across P1 lags 45° behind the current I, the in-phase component of the former still delivering power to the circuit. As shown in Fig. 2(e) eventually the voltage lags 90° behind the current I, at which time power transfer is stopped. At this instant, however, the E. M. F. source $E_{c1}$ and the current I have the values obtaining under the initial conditions. This means as previously explained, that a large voltage will be induced across the secondary S2, causing the tube GT to fire again. Current will again attempt to flow through the secondary $S_1$ in such a direction as to charge the condenser C2, instantly shifting the phase of the induced voltage $V_{P1}$ from the condition shown in Fig. 2(e) back to the condition shown in Fig. 2(a), whereby the action previously explained in connection with the remaining diagrams of Fig. 2 will be repeated and the oscillations will be sustained.

At no time during the operation of the circuits is the voltage $V_{P1}$ more than 90° out of phase with the current I. Consequently, no component of this voltage is ever 180° out of phase with the current; thus no power is ever extracted from the circuit, that is, returned to the battery. All power transfer is from the battery to the circuit. This power serves to compensate for resistance losses in the circuits, thereby sustaining oscillations at a level at which the delivery of power just balances the power consumption.

In order to enable steady-state oscillations it is necessary that the voltage across condenser C2, which during the discharge of the glow tube GT has dropped from a high value $V''$ to a low value $V'$, be restored to its high value $V''$ by the current flowing into the condenser from battery B while the tube is cut off. If the energy delivered by battery B to the circuit during this current flow is $W_B$ and the energy dissipated by tube GT during its conductivity is $W_T$, then $W_B$ must exceed $W_T$ in order to create a reserve to compensate circuit losses. If $V_S$ is the sustaining potential of tube GT and Q is the charge on condenser C2 having the capacity C, then $W_T = V_S . \Delta Q$; similarly, $W_B = E_B . \Delta Q$ where $E_B$ is the voltage of battery B. Since $\Delta Q$, the variation of the charge on condenser C2, is given in both instances by the voltage swing between $V'$ and $V''$, thus $$\Delta Q = C(V'' - V')$$

it follows that the battery voltage $E_B$ must be greater than the sustaining voltage $V_S$. If this is not the case, or if the excess of $E_B$ over $V_S$ is insufficient to enable compensation for circuit losses, then the battery circuit B, $S_1$, RE, C2, L2 will not return during off-periods as much energy to the tank circuit C1, P1, P2, L1 as is withdrawn therefrom during periods of conductivity of the tube GT; hence in such cases the train of oscillations initiated by the throwing of the switch SW will terminate when the energy reserve originally stored on condenser C1 is exhausted. It will thus be apparent that by the use of a suitably proportioned storage condenser C1 a train of oscillations enduring for a definite length of time may be generated by one operation of the switch SW.

It will be understood that if the glow tube GT had been omitted there would be no available closed path for the battery, and no power could be consumed to sustain any oscillations. The tube, however, acts on an electronic interrupter, intermittently establishing such a path for transferring energy at suitably spaced intervals to the tuned circuits. It will also be noted that the operation of this electronic interrupter is initiated by a transient due to the reversal of switch SW and that subsequent actuation of this interrupter is accomplished by similar transients derived from the ensuing oscillations themselves.

The invention is not to be construed as limited to the specific embodiment shown and described herein but is, on the contrary, subject to many variations and modifications without exceeding the scope thereof as defined in the appended claims.

We claim:

1. In an oscillator, in combination, a source of direct current, a discharge path for said source, an electronic switch in said discharge path, said electronic switch normally blocking said path and being responsive to a predetermined breakdown voltage for momentarily unblocking said path, said breakdown voltage being greater than the voltage of said source, an oscillatory circuit, circuit means including said source for exciting said oscillatory circuit, step-up transformer means for deriving from said oscillatory circuit a transient voltage at least equal to said breakdown voltage and applying said transient voltage to said electronic switch, thereby causing a current to flow in said discharge path, and coupling means between said discharge path and said oscillatory circuit, said coupling means transferring energy from said battery to said oscillatory circuit, thereby maintaining said oscillations at least for a plurality of cycles.

2. The combination according to claim 1 wherein said electronic switch is a gas-filled electron tube having a cold cathode.

3. The combination according to claim 2 wherein said electron tube has a sustaining voltage greater than the voltage of said source of direct current.

4. The combination according to claim 1 wherein said discharge path includes inductive and capacitive circuit elements resonant at a frequency less than the frequency of said oscillatory circuit.

5. The combination according to claim 4 wherein said inductive and capacitive elements are resonant at substantially half the frequency of said oscillatory circuit.

6. The combination according to claim 1 wherein said discharge path includes a condenser bridged by said electronic switch.

7. The combination according to claim 6 wherein said discharge path includes rectifier means in series with said condenser and said source, said rectifier means offering a low resistance to charging current flowing from said source into said condenser.

8. The combination according to claim 7 wherein said discharge path includes inductive means resonating said condenser at a frequency lower than the frequency of said oscillatory circuit.

9. The combination according to claim 8 wherein said coupling means comprises a coupling transformer, said inductive means including a winding of said coupling transformer, said oscillatory circuit including another winding of said coupling transformer.

10. An oscillator comprising a single source of direct current, a gas-filled electron tube having a cold cathode and having a breakdown voltage greater than the voltage of said source, said tube being connected in series with said source, a manually operable switch, an oscillatory circuit including a condenser, means including said switch for charging said condenser from said source and for discharging said condenser through said oscillatory circuit, thereby exciting said oscillatory circuit, step-up transformer means for deriving from said oscillatory circuit a transient voltage at least equal to said breakdown voltage and applying said breakdown voltage to said tube in series-aiding relation to the voltage of said source, thereby causing a discharge current to flow from said battery through said tube, and coupling means transferring energy from said discharge current to said oscillatory circuit, thereby sustaining said oscillations at least for a plurality of cycles.

11. An oscillation generator comprising a source of direct current, a discharge path for said source, an electronic switch in said discharge path, said electronic switch normally blocking said path and being responsive to a predetermined breakdown voltage for momentarily unblocking said path, said breakdown voltage being greater than the voltage of said source, an oscillatory tank circuit including a storage condenser, switch means for charging said storage condenser from said source and for initiating a train of oscillatory cycles in said tank circuit following said charging, and coupling means between said tank circuit and said discharge path for transferring sufficient energy to said path for setting up therein, and applying to said electronic switch, transient voltages at least equal to said breakdown voltage and occurring over a succession of oscillatory cycles in said tank circuit, thereby causing repeated unblocking of said path following initiation of said train of cycles.

12. An oscillation generator according to claim 11 wherein said discharge path includes condenser means adapted to be discharged through said electronic switch, during the momentary unblocking of said path, and to be recharged from said source in the blocked condition of said path, said coupling means transferring energy from said source to said tank circuit during the recharging of said condenser means.

PHIL CUTLER.
KARL F. ROSS.

REFERENCES CITED

The following references are of record in the file of this patent:

UNITED STATES PATENTS

| Number | Name | Date |
| --- | --- | --- |
| 1,418,023 | Reisz | May 30, 1922 |
| 2,046,463 | Kock | July 7, 1936 |
| 2,239,786 | Jones | Apr. 29, 1941 |
| 2,368,090 | Abernatby | Jan. 30, 1945 |
| 2,413,391 | Usselman | Dec. 31, 1946 |
| 2,449,077 | Lindenblad | Sept. 14, 1948 |